(12) United States Patent
Fujiwara et al.

(10) Patent No.: US 11,233,354 B2
(45) Date of Patent: Jan. 25, 2022

(54) HERMETIC TERMINAL AND SENSOR UNIT

(71) Applicant: Yokogawa Electric Corporation, Tokyo (JP)

(72) Inventors: Hideki Fujiwara, Tokyo (JP); Kohei Tomonaga, Tokyo (JP); Yasushi Hyono, Tokyo (JP); Tomoya Taguchi, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 170 days.

(21) Appl. No.: 16/365,834

(22) Filed: Mar. 27, 2019

(65) Prior Publication Data
US 2019/0305472 A1    Oct. 3, 2019

(30) Foreign Application Priority Data

Mar. 30, 2018  (JP) .............................. JP2018-068438

(51) Int. Cl.
| | |
|---|---|
| H01R 13/52 | (2006.01) |
| G01L 7/08 | (2006.01) |
| H01B 17/30 | (2006.01) |
| H01R 13/504 | (2006.01) |
| H01R 13/6581 | (2011.01) |
| G01L 19/00 | (2006.01) |
| H01R 13/6591 | (2011.01) |

(52) U.S. Cl.
CPC .......... *H01R 13/5202* (2013.01); *G01L 7/082* (2013.01); *G01L 19/0084* (2013.01); *H01B 17/303* (2013.01); *H01R 13/504* (2013.01); *H01R 13/521* (2013.01); *H01R 13/6581* (2013.01); *H01R 13/6591* (2013.01); *H01R 2201/20* (2013.01)

(58) Field of Classification Search
CPC .............. H01R 13/5202; H01R 13/504; H01R 13/521; H01R 13/6581; H01R 13/6591; H01R 2201/20; H01R 9/20; G01L 19/0084; G01L 7/082; G01L 19/0061; H01B 17/303; G01D 11/00
USPC ........................................................... 73/723
See application file for complete search history.

(56) References Cited

U.S. PATENT DOCUMENTS 4,296,275 A * 10/1981 Bowsky ............... H01R 13/521
   174/152 GM
4,675,643 A *  6/1987 Tanner ................ G01L 19/0084
   338/3
5,755,743 A *  5/1998 Volz ..................... A61N 1/3754
   607/36

(Continued)

FOREIGN PATENT DOCUMENTS

| EP | 317664 A1 * | 5/1989 |
| EP | 0317664 A1 | 5/1989 |
| JP | 2004-012406 A | 1/2004 |

*Primary Examiner* — Marrit Eyassu
(74) *Attorney, Agent, or Firm* — Sughrue Mion, PLLC

(57) ABSTRACT

A hermetic terminal (110) includes a barrier wall (12) to be joined to a housing (11), a body (15) that is to be connected to a signal ground and is fixed to the barrier wall (12) via a first insulator (13), and a signal line (16) passing through the body (15) and fixed to the body (15) via a second insulator (14). When the barrier wall (12) is joined to the housing (11), a space (28) is formed between an inner wall of the housing (11) and a surface (31) of the body (15) intersecting an end face (29) of the body (15) positioned towards the inside of the housing (11).

10 Claims, 12 Drawing Sheets

(56) References Cited

U.S. PATENT DOCUMENTS

| | | | |
|---|---|---|---|
| 7,517,258 B1 * | 4/2009 | Taylor | H01R 13/5202 29/856 |
| 2007/0239223 A1 * | 10/2007 | Engmark | A61N 1/3754 607/37 |
| 2016/0020547 A1 * | 1/2016 | Khadkikar | F04B 53/16 439/587 |
| 2016/0359261 A1 * | 12/2016 | True | H01R 13/521 |
| 2017/0080239 A1 | 3/2017 | Seitz et al. | |
| 2017/0092907 A1 * | 3/2017 | Hyung | H01M 2/30 |

* cited by examiner

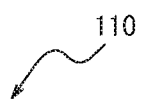
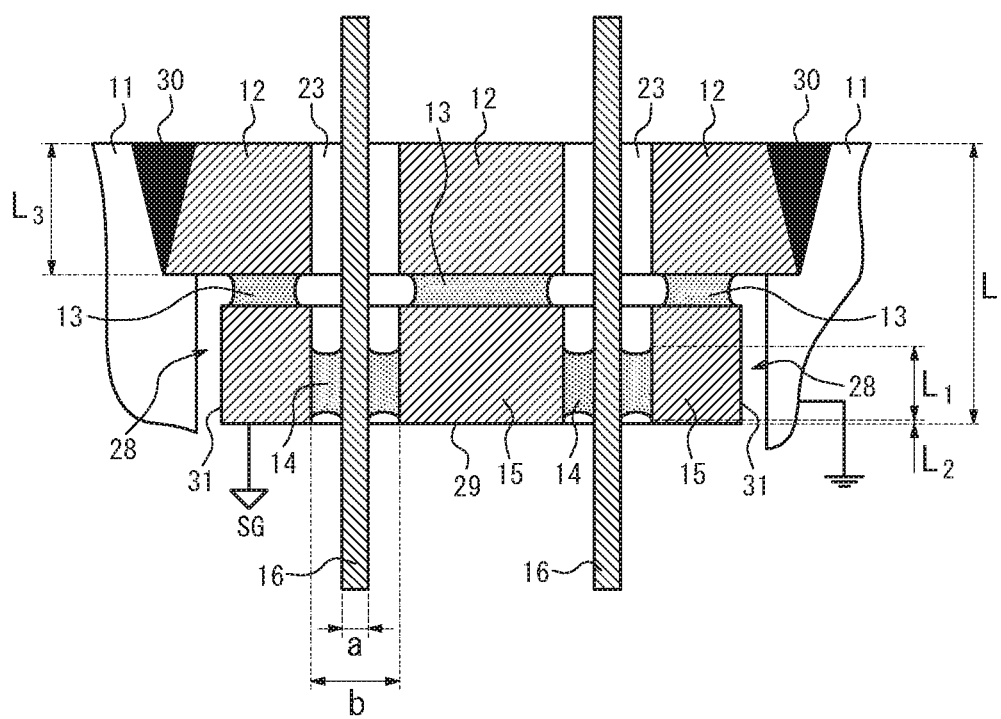

HERMETIC TERMINAL AND SENSOR UNIT

CROSS-REFERENCE TO RELATED APPLICATION

The present application claims priority to and the benefit of Japanese Patent Application No. 2018-068438 filed Mar. 30, 2018, the entire contents of which are incorporated herein by reference.

TECHNICAL FIELD

The present disclosure relates to a hermetic terminal, attached to a housing of a sensor unit for measuring a physical quantity, and to a sensor unit.

BACKGROUND

A sensor unit for measuring various physical quantities during process control of a plant is known. A hermetic terminal may be attached to the housing of the sensor unit for input and output of signals from device elements or the like hermetically sealed or vacuum sealed in the sensor unit. For example, patent literature (PTL) 1 discloses a sensor unit that is a liquid sealed pressure sensor for detecting liquid pressure.

CITATION LIST

Patent Literature

PTL 1: JP2004012406A

SUMMARY

A hermetic terminal according to an embodiment includes a barrier wall to be joined to a housing, a body to be connected to a signal ground, the body being fixed to the barrier wall via a first insulator, and a signal line passing through the body and fixed to the body via a second insulator. When the barrier wall is joined to the housing, a space is formed between an inner wall of the housing and a surface of the body intersecting an end face of the body positioned towards the inside of the housing.

A sensor unit according to an embodiment includes the above-described hermetic terminals.

BRIEF DESCRIPTION OF THE DRAWINGS

In the accompanying drawings:

FIG. 5 is a cross-section of a hermetic terminal according to a first embodiment of the present disclosure;

DETAILED DESCRIPTION

Figure 1:
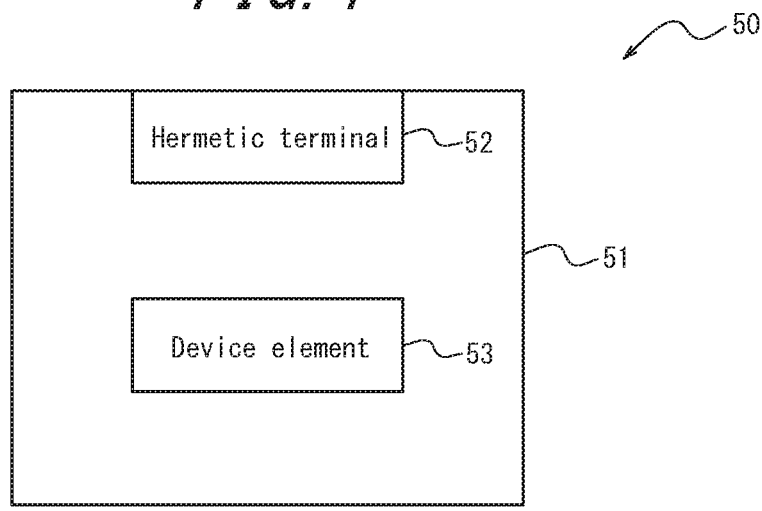
FIG. 1 is a functional block diagram illustrating an example schematic configuration of a sensor unit.

To ensure safety at the location where the sensor unit is used, such as a plant, and to ensure stable measurement of physical quantities, erroneous operations during measurement are required to be reduced as much as possible. The sensor unit may be used in a high-pressure environment or an explosive atmosphere and may also be used in the presence of noise generated by rotating machinery, a power source, or the like. Sensor units and hermetic terminals are therefore required to be resistant to noise while also being sufficiently resistant to high pressure and explosion proof for their use environment.

An objective of the present disclosure is to provide a hermetic terminal and a sensor unit that have improved resistance to noise, are usable in an explosive atmosphere, and have improved resistance to high pressure.

A hermetic terminal according to an embodiment includes a barrier wall to be joined to a housing, a body to be connected to a signal ground, the body being fixed to the barrier wall via a first insulator, and a signal line passing through the body and fixed to the body via a second insulator. When the barrier wall is joined to the housing, a space is formed between an inner wall of the housing and a surface of the body intersecting an end face of the body positioned towards the inside of the housing. This configuration can reduce the parasitic capacitance between the housing and the signal line, thereby improving resistance to noise. A requirement, in explosion-proof standards, relating to the interval between the housing and the signal line can also be satisfied more easily, allowing use in an explosive atmosphere. Furthermore, the stress applied to the second insulator is reduced, thereby improving the fracture endurance and the resistance to high pressure.

In a hermetic terminal according to an embodiment, the body may be fixed to the barrier wall at a position towards the inside of the housing from the barrier wall when the barrier wall is joined to the housing. This configuration can ensure a space between the inner wall of the housing and the surface of the body intersecting the inner end face of the body, thereby reducing the stress applied to the second insulator and improving the resistance to high pressure.

In a hermetic terminal according to an embodiment, the barrier wall may include an opening, and the body may be fixed to the barrier wall via the first insulator so as to cover the opening. The hermetic terminal thus configured to include a barrier wall with an opening can improve resistance to noise, allow use in an explosive atmosphere, and improve resistance to high pressure.

In a hermetic terminal according to an embodiment, the second insulator may be disposed towards the inside of the housing from the first insulator. The second insulator in this configuration is disposed in a range included in the height of the space. The stress applied to the second insulator is consequently reduced, improving the fracture endurance and the resistance to high pressure.

In a hermetic terminal according to an embodiment, the length from an inner end to an outer end of the second insulator may be less than the difference between the length from an inner end to an outer end of the hermetic terminal and the length from an inner end to an outer end of a joining metal for joining the barrier wall to the housing. This configuration can ensure a space between the housing and the inner wall, thereby reducing the stress applied to the second insulator and improving the resistance to high pressure.

In a hermetic terminal according to an embodiment, the difference between the length from an inner end to an outer end of the hermetic terminal and the length from an inner end of the second insulator to an inner end of the body may be greater than the length from an inner end to an outer end of a joining metal for joining the barrier wall to the housing. This configuration makes it easier for the pressure applied to the surface intersecting the inner end face of the body to be transmitted to the second insulator. Consequently, the stress applied to the second insulator is reduced, improving the resistance to high pressure.

A hermetic terminal according to an embodiment may further include a plurality of the signal lines and an impedance element electrically connecting the plurality of the signal lines. This configuration reduces the parasitic capacitance between the housing of the hermetic terminal and the signal lines, thereby improving resistance to noise.

A hermetic terminal according to an embodiment may further include a conductive material attached to the body and covering the impedance element. The body and the conductive material in this configuration function as a shield against noise, since in addition to the noise that mixes in from the signal line, noise that mixes in from the housing also flows to the signal ground. The resistance to noise thereby improves.

A hermetic terminal according to an embodiment may further include an insulator surrounding the conductive material. The insulator in this configuration can shorten the separation distance in predetermined standards, thereby allowing the distance between the housing and the body, which is connected to the signal ground via the conductive material, to be shortened. The hermetic terminal can thus be reduced in size.

A sensor unit according to an embodiment includes any of the above-described hermetic terminals. This configuration can reduce the parasitic capacitance between the housing and the signal line, thereby improving resistance to noise. A requirement, in explosion-proof standards, relating to the interval between the housing and the signal line can also be satisfied more easily, allowing use in an explosive atmosphere. Furthermore, the stress applied to the second insulator is reduced, thereby improving the fracture endurance and the resistance to high pressure.

Embodiments of the present disclosure are described below with reference to the drawings.

The present disclosure relates to hermetic terminal and a sensor unit. FIG. 1 is a functional block diagram illustrating an example schematic configuration of a sensor unit. A sensor unit 50 is a measurement unit used for measuring various physical quantities during process control of a plant or the like. The sensor unit 50 may, for example, be used in a differential pressure transmitter, a pressure transmitter, or another pressure gauge. A differential pressure transmitter measures the flow rate, liquid level, density, pressure, and the like of a liquid, gas, or vapor and outputs a signal corresponding to the measurement result. A pressure transmitter measures the pressure of a liquid, gas, or vapor and outputs a signal corresponding to the measurement result. The sensor unit 50, however, is not limited to these examples and may be used in any other device. The outline of the sensor unit 50 is prescribed by a housing 51. A hermetic terminal 52 may be used in the sensor unit 50. The hermetic terminal 52 can input and output signals from a device element 53 or the like hermetically sealed or vacuum sealed in the sensor unit 50. Examples of the plant include an industrial plant such as a chemical plant; a plant for managing a well site, such as a gas field or oil field, and the surrounding area; a plant for managing power generation such as water power, thermal power, nuclear power, or the like; a plant for managing environmental power generation such as solar power, wind power, or the like; and a plant for managing water and sewage, a dam, or the like.

Figure 2:
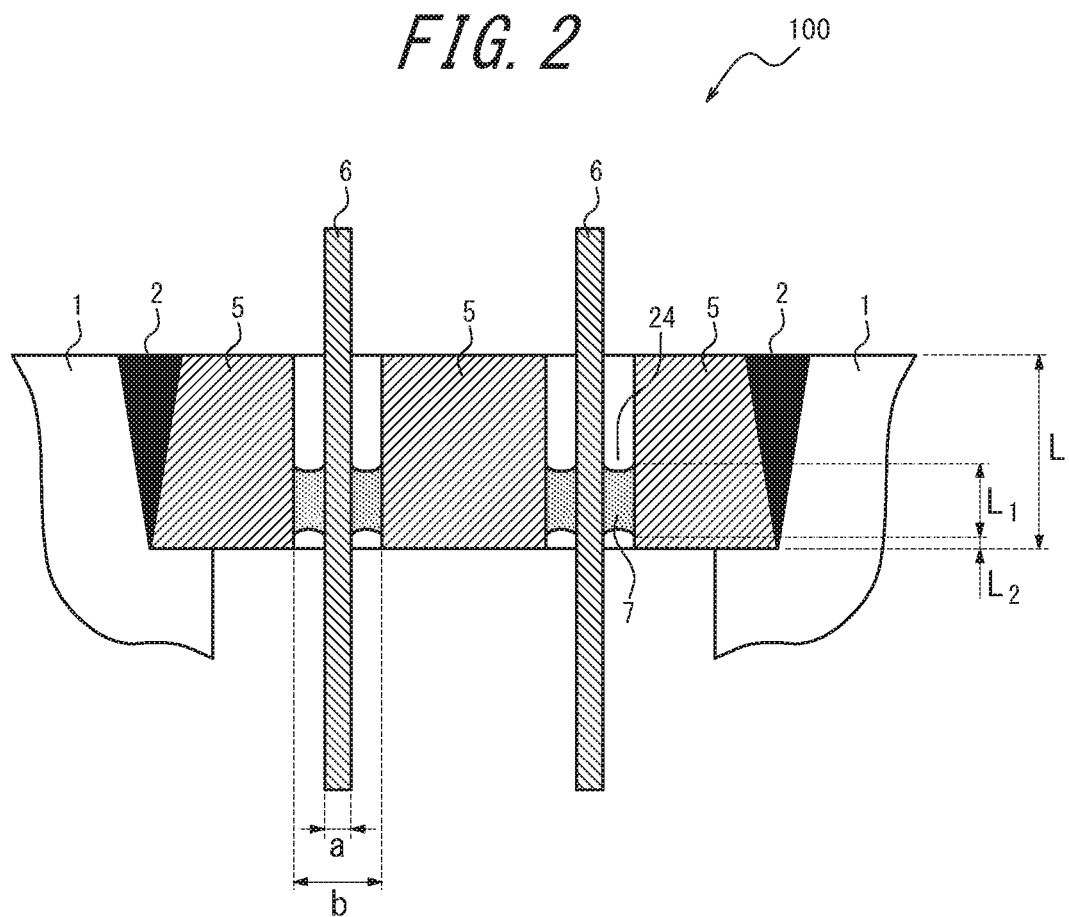
FIG. 2 is a cross-section of a hermetic terminal of a comparative example.

FIG. 2 is a cross-section of a hermetic terminal 100 of a comparative example. For example, the hermetic terminal 100 of the comparative example in FIG. 2 is attached to a housing 1 of a sensor unit. The housing 1 is grounded. Holes are provided in the housing 1. The hermetic terminal 100 is attached to the housing 1 so as to block the holes of the housing 1. The hermetic terminal 100 is joined to the housing 1 by, for example, being welded to the housing 1 via a weld metal 2. The housing 1 is a container for the sensor unit. In FIG. 2, the area above the hermetic terminal 100 is the outer portion of the housing 1, and the area below the hermetic terminal 100 is the inner portion of the housing 1.

The hermetic terminal 100 includes a body 5. Holes 24 are provided in the body 5. The body 5 includes two holes 24 in the example in FIG. 2. One signal line 6 passes through each hole 24. The signal line 6 is both fixed to the body 5 and electrically insulated from the body 5 by an insulator 7, such as glass.

Figure 3:
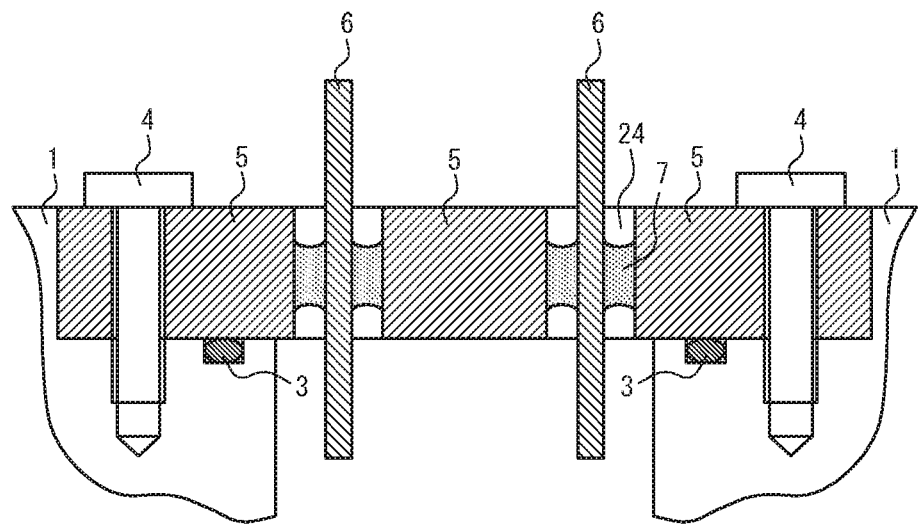
FIG. 3 is a cross-section of a hermetic terminal of another comparative example.

FIG. 3 is a cross-section of a hermetic terminal 101 of another comparative example. The hermetic terminal 101 illustrated in FIG. 3 has a similar structure to that of the hermetic terminal 100 illustrated in FIG. 2. Specifically, the hermetic terminal 101 includes a body 5, signal lines 6 passing through holes 24 of the body 5, and insulators 7 fixing the signal lines 6 to the body 5. Like the hermetic terminal 100 illustrated in FIG. 2, the hermetic terminal 101 illustrated in FIG. 3 is also joined to the housing 1. Unlike the hermetic terminal 100 illustrated in FIG. 2, however, the hermetic terminal 101 illustrated in FIG. 3 is fixed to the housing 1 using screws 4 instead of the weld metal 2, and the body 5 and housing 1 are sealed together with seal member 3, such as an O ring.

Figure 4:
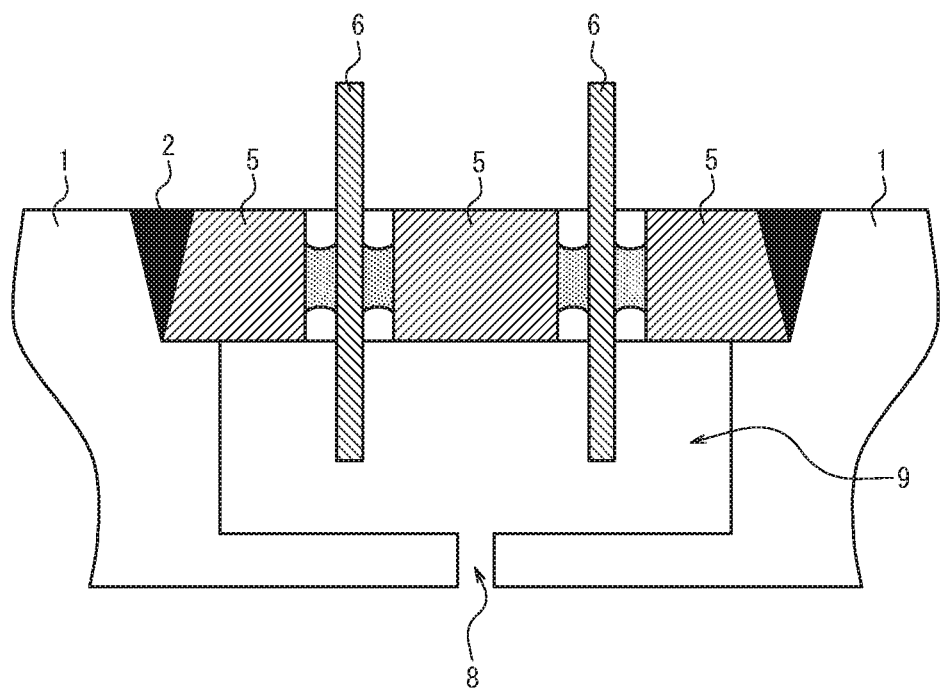
FIG. 4 illustrates the signal transmission process by a hermetic terminal of the comparative example.

FIG. 4 illustrates the signal transmission process by the hermetic terminal 100 of the comparative example. FIG. 4 is a cross-section of the hermetic terminal 100 and a portion of the housing 1. As illustrated in FIG. 4, a pressure vessel chamber 9 is provided inside the housing 1. A device element for measuring a particular physical quantity, such as pressure, is provided in the pressure vessel chamber 9 and is electrically connected to the signal line 6. The pressure vessel chamber 9 includes a process pressure introduction hole 8 that connects the pressure vessel chamber 9 to an area that is outside the pressure vessel chamber 9 and inside the housing 1. The pressure of the process is transmitted to the pressure vessel chamber 9 through the process pressure introduction hole 8. The pressure of the process may, for example, be transmitted to the pressure vessel chamber 9 by a gas or liquid of the process being supplied to the pressure vessel chamber 9 directly through the process pressure introduction hole 8. The pressure of the process may, for example, be transmitted to the pressure vessel chamber 9 through an intermediate medium, such as silicone oil. The device element inside the pressure vessel chamber 9 detects the transmitted pressure of the process and generates a signal corresponding to the detected pressure. The generated signal is transmitted via the signal lines 6 to a signal processing circuit (not illustrated) external to the housing 1.

For stable measurement of physical quantities such as pressure, erroneous operations during measurement are required to be reduced as much as possible in the signal transmission of the hermetic terminal. In other words, the resistance to noise of the hermetic terminal is preferably improved. Furthermore, since the sensor unit might be used in a high-pressure environment or an explosive atmosphere, the hermetic terminal is preferably usable in an explosive atmosphere and preferably has better resistance to high pressure.

One way to achieve resistance to high pressure could be to reduce the pressure on the hermetic terminal. In other words, the area of the surface of the hermetic terminal subjected to pressure from the pressure vessel chamber 9 could be reduced. Reducing the size of the hermetic terminal, however, decreases the distance between the grounded housing 1 and the signal lines 6. Consequently, the parasitic capacitance between the housing 1 and the signal lines 6 increases, increasing the likelihood that noise applied to the housing 1 will be overlaid on the signal that corresponds to pressure and is transmitted via the signal lines 6.

Furthermore, to be usable in an explosive atmosphere, the hermetic terminal is required to have a structure meeting the provisions of predetermined explosion-proof standards, such as international electrotechnical commission (IEC) standards, factory mutual (FM) standards, or Canadian standard association (CSA) standards. Some of these explosion-proof standards include prescriptions relating to the interval between the grounded housing 1 and the signal lines 6. In this case, the interval required by the explosion-proof standards between the housing 1 and the signal lines 6 needs to be ensured. If the hermetic terminal is increased in size to ensure the interval between the housing 1 and the signal lines 6, however, the pressure acting on the hermetic terminal from inside the pressure vessel chamber 9 increases, making it difficult to achieve resistance to high pressure.

First Embodiment

FIG. 5 is a cross-section of a hermetic terminal 110 according to a first embodiment of the present disclosure. The hermetic terminal 110 of the first embodiment in FIG. 5 is attached to a housing 11 of a sensor unit. The housing 11 is grounded. Holes are provided in the housing 11. The hermetic terminal 110 is attached to the housing 11 so as to block the holes of the housing 11. In FIG. 5, the area above the hermetic terminal 110 is the outer portion of the housing 11, and the area below the hermetic terminal 110 is the inner portion of the housing 11. The space below the hermetic terminal 110 may, for example, be a pressure vessel chamber. For example, the pressure vessel chamber is filled with an intermediate medium, such as silicone oil, that transmits the pressure of a process.

The hermetic terminal 110 includes a barrier wall 12. A body 15 is fixed to the barrier wall 12 via an insulator 13 towards the inside of the housing 11. The body 15 is connected to a signal ground (SG, such as a common potential in a signal processing circuit outside the housing). The barrier wall 12 and the body 15 have, for example, a disk shape. Holes 23 passing through the barrier wall 12 and the body 15 are provided in the barrier wall 12 and the body 15. The barrier wall 12 and the body 15 include two holes 23 in the example in FIG. 5. One signal line 16 passes through each hole 23 in the barrier wall 12 and the body 15. The signal line 16 is both fixed to the body 15 and electrically insulated from the body 15 by an insulator 14. For example, the signal lines 16 may be conductors that transmit a signal corresponding to pressure.

The hermetic terminal 110 is fixed to the housing 11 by, for example, being welded to the housing 11 via a weld metal 30. In the hermetic terminal 110, the barrier wall 12 is joined to the housing 11 via the weld metal 30. In other words, the body 15 of the hermetic terminal 110 is not joined to the housing 11. Since the body 15 is fixed to the inside of the barrier wall 12, a space 28 is formed between the inner wall of the housing 11 and a surface 31 that intersects an inner end face 29 of the body 15.

In the hermetic terminal 110, the insulator 14 is disposed in the hole 23 of the body 15 and is therefore disposed towards the inside of the housing 11 from the insulator 13. In other words, assuming that the direction of the outer end face and the inner end face in the hermetic terminal 110 is the height direction, the insulator 14 is disposed in a range included in the height of the space 28.

Figure 6:
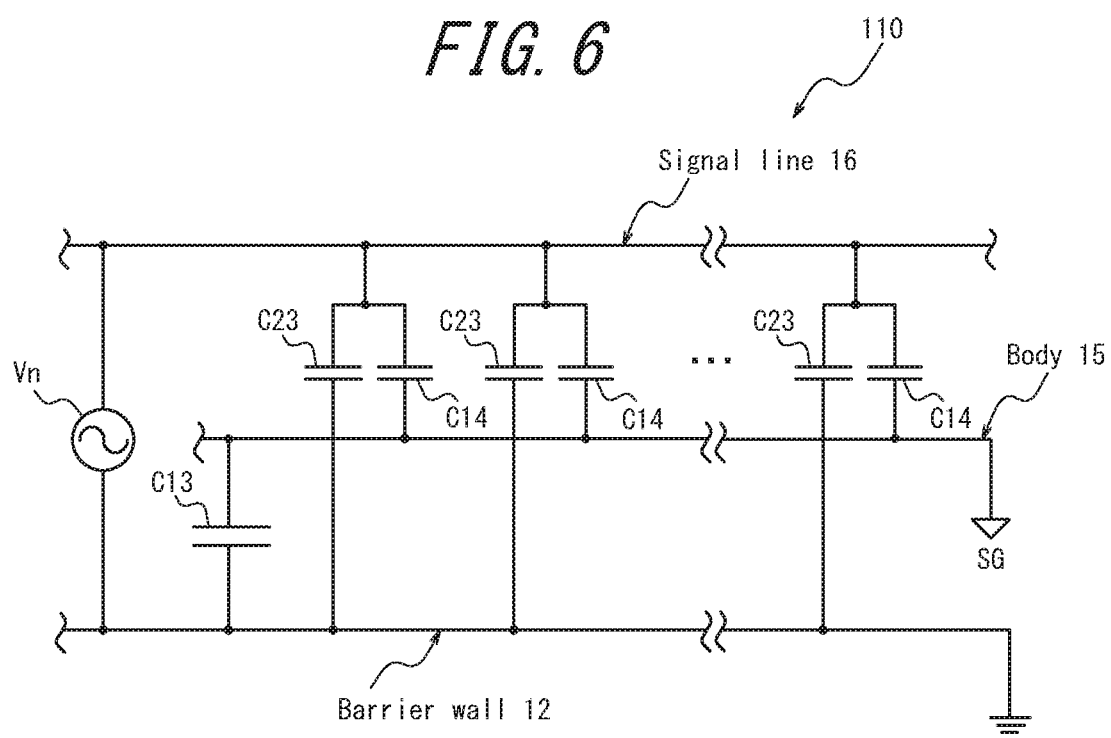
FIG. 6 illustrates an equivalent circuit of the hermetic terminal in FIG. 5.

FIG. 6 illustrates an equivalent circuit of the hermetic terminal 110 in FIG. 5. As illustrated in FIG. 6, the capacitance between the barrier wall 12 and the body 15 with the insulator 13 therebetween is designated as C13, the capacitance between the body 15 and the signal line 16 with the insulator 14 therebetween is designated as C14, and the capacitance of the hole 23 between the barrier wall 12 and the signal line 16 is designated as C23. In FIG. 6, Vn represents noise voltage.

Since the body 15 in the hermetic terminal 110 is connected to the signal ground, the body 15 functions as a shield against noise that mixes in from the grounded portion of the housing 11 and the signal line 16. The parasitic capacitance between the housing 11 and the signal line 16 is thereby reduced.

The parasitic capacitance of the hermetic terminals 100 and 110 is now described with reference to FIG. 2 and FIG. 5. The thickness of the hermetic terminals 100 and 110 is designated as L. The thickness of the hermetic terminal is the length from the inner end to the outer end. In other words, the length from the inner surface to the outer surface of the body 5 in the hermetic terminal 100 of the comparative example is the thickness L of the hermetic terminal 100, as illustrated in FIG. 2. On the other hand, the length from the outer surface of the barrier wall 12 to the inner surface of the body 15 in the hermetic terminal 110 of the present embodiment is the thickness L of the hermetic terminal 110, as illustrated in FIG. 5. The length of the insulator 7 that fixes the signal line 6 and of the insulator 14 that fixes the signal line 16 is designated as $L_1$. The thickness of the insulators 7 and 14 is the length from the inner end to the outer end. Accordingly, the length of the insulators 7 and 14 refers to the length in the extending direction of the signal lines 6 and 16 in the examples illustrated in FIG. 2 and FIG. 5. The length (distance) from the inner end of the insulator 7 to the inner end face of the body 5, and from the inner end of the insulator 14 to the inner end face of the body 15, is designated as $L_2$. The diameter of the signal lines 6 and 16 is designated as a, and the diameter of the holes 23 and 24 is designated as b.

The relative permittivity of the insulators 7 and 14 is designated as $\varepsilon_{r1}$, and the relative permittivity of the intermediate medium inside the pressure vessel chamber is designated as $\varepsilon_{r2}$. The outside of the housings 1 and 11 is assumed to be atmospheric air. In other words, relative permittivity of the gas outside the housings 1 and 11 is assumed to be 1.

At this time, the parasitic capacitance C1 between the housing 1 and the signal line 6 of the hermetic terminal 100 in the comparative example illustrated in FIG. 2 is expressed in Equation (1) below, using a coefficient k.

$$C1 = k\frac{(\varepsilon_{r2}-1)L_2 + L_1(\varepsilon_{r1}-1) + L}{\log\frac{b}{a}} \quad (1)$$

As can be seen from Equation (1), the parasitic capacitance C1 is proportional to the sum of a term that includes the length L of the hermetic terminal, a term that includes the length $L_1$ of the insulator, and a term that includes the length $L_2$ from the inner end of the insulator 7 to the inner end of the body 5. Accordingly, when the length L and the length $L_2$ are constant, for example, the parasitic capacitance C1 increases as the length $L_1$ is greater.

On the other hand, the parasitic capacitance C2 between the housing 11 and the signal line 16 of the hermetic terminal 110 according to the present embodiment illustrated in FIG. 5 is expressed in Equation (2) below, using a coefficient k.

$$C2 = k\frac{L_3}{\log\frac{b}{a}} \quad (2)$$

In Equation (2), $L_3$ is the length of the weld metal 30. Since the body 15 is connected to the signal ground in the hermetic terminal 110, the capacitance between the insulator 14 and the ground is 0. As the length $L_1$ of the insulator 14 is greater, the parasitic capacitance C23 of the hole 23 between the barrier wall 12 and the signal line 16 decreases. Furthermore, since the capacitance between grounds is 0, the capacitance along the length $L_2$ from the inner end of the insulator 14 to the inner end of the body 15 (i.e. the end face 29) does not affect the parasitic capacitance C2. For these reasons, the parasitic capacitance C2 decreases in the hermetic terminal 110 according to the present embodiment as the length $L_1$ of the insulator 14 is greater, as can also be seen from Equation (2).

Figure 7:
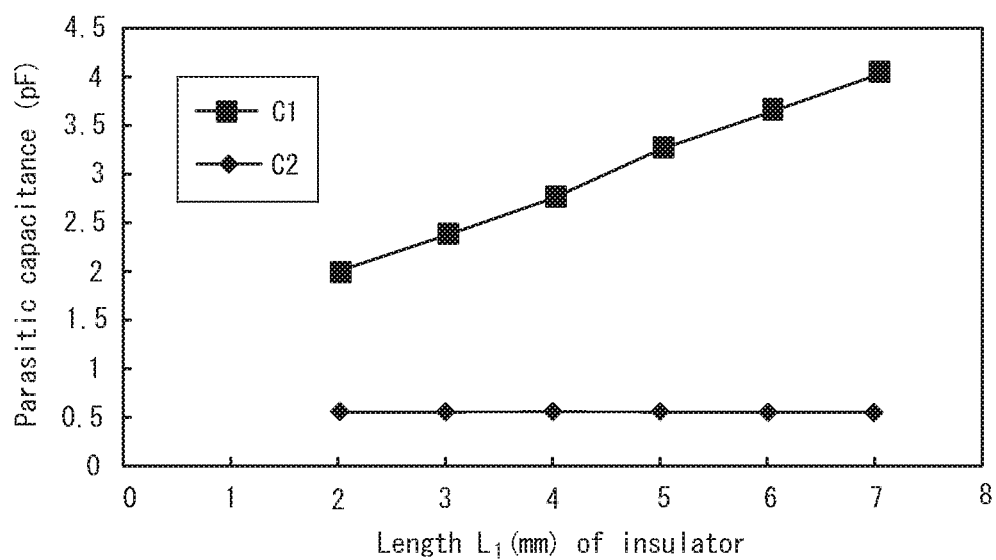
FIG. 7 illustrates the parasitic capacitance of the hermetic terminal of the comparative example and the hermetic terminal according to the first embodiment.

FIG. 7 illustrates the parasitic capacitance C1 of the hermetic terminal 100 of the comparative example and the parasitic capacitance C2 of the hermetic terminal 110 according to the first embodiment. FIG. 7 illustrates the relationship between the length $L_1$ of the insulator, the parasitic capacitance C1, and the parasitic capacitance C2 for the case of the length L of the hermetic terminal being 10 mm, the length $L_2$ from the inner end of the insulator to the inner end of the body being 0 mm, the ratio of the diameter b to the diameter a, i.e. b/a, being 3, and the relative permittivity $\varepsilon_{r1}$ of the insulator being 4.6.

As illustrated in FIG. 7, the parasitic capacitance C1 of the hermetic terminal 100 of the comparative example is greater than the parasitic capacitance C2 of the hermetic terminal 110 according to the present embodiment. Furthermore, as the length $L_1$ of the insulator is greater, the parasitic capacitance C1 of the hermetic terminal 100 of the comparative example increases, whereas the parasitic capacitance C2 of the hermetic terminal 110 according to the present embodiment remains constant. Therefore, the difference between the parasitic capacitance C1 and the parasitic capacitance C2 increases as the length $L_1$ of the insulator is greater. The length $L_1$ sometimes varies when the insulator 14 is enclosed in the hole 23 during manufacturing of the hermetic terminal 110 and therefore is placed on the horizontal axis in FIG. 7.

In this way, the hermetic terminal 110 according to the present embodiment can reduce the parasitic capacitance C2. The hermetic terminal 110 can thus improve resistance to noise.

In the hermetic terminal 110 according to the present embodiment, the barrier wall 12 is disposed between the grounded housing 11 and the signal line 16. Some explosion-proof standards include prescriptions relating to the interval between the grounded housing 11 and the signal line 16. By including the barrier wall 12, the hermetic terminal 110 provides a constant distance between the grounded housing 11 and the signal line 16. The hermetic terminal 110 can thus more easily satisfy the requirement of the explosion-proof standards relating to the interval between the housing 11 and the signal line 16. Therefore, the hermetic terminal 110 can be used in an explosive atmosphere.

In the hermetic terminal 110 according to the present embodiment, the barrier wall 12 is joined to the housing 11 via the weld metal 30, and the body 15 that is fixed towards the inside from the barrier wall 12 is not joined to the housing 11. Accordingly, the length $L_3$ of the weld metal 30 satisfies the relationship $L>L_3$. The length $L_3$ of the weld metal 30 is the length from the inner end to the outer end. The length $L_1$ of the insulator 14 satisfies the relationship $L_1<L-L_3$.

Figure 8:
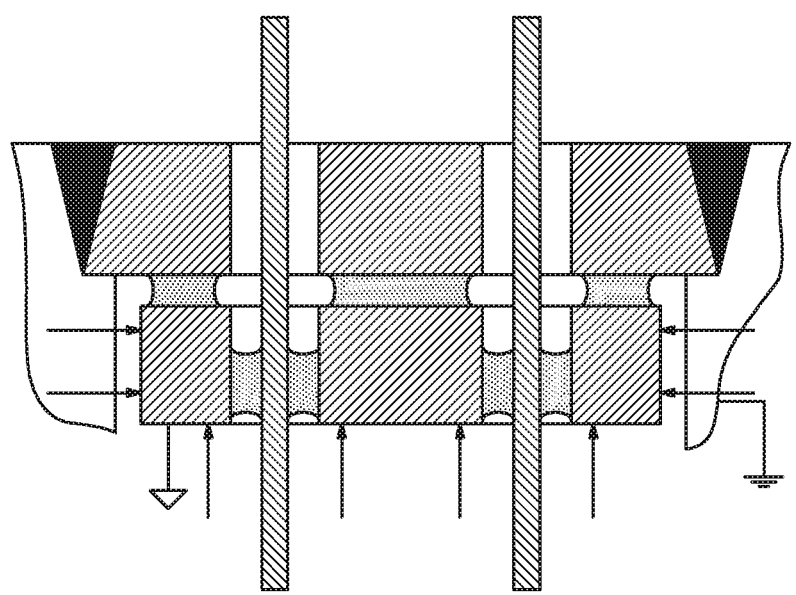
FIG. 8 illustrates pressure acting on the hermetic terminal of FIG. 5.

Here, as illustrated in FIG. 5, the space 28 of length $L-L_3$ is formed between the hermetic terminal 110 and the housing 11. FIG. 8 illustrates pressure acting on the hermetic terminal 110 of FIG. 5. As indicated by the arrows in FIG. 8, the hermetic terminal 110 receives pressure from the pressure vessel chamber side at the end face 29 and the surface 31. In other words, the hermetic terminal 100 of the comparative example receives pressure from the pressure vessel chamber side only at the inner end face of the body, for example. In the hermetic terminal 110 according to the present embodiment, however, pressure is applied not only to the end face 29 but also to the surface 31 intersecting the end face 29. When, for example, the relationship $L-L_2>L_3$ is satisfied, the pressure applied to the surface 31 is more easily transmitted to the insulator 14.

In the hermetic terminal 100 of the comparative example, the pressure from the pressure vessel chamber side produces a pressure σ1 on the insulator 7 in the direction from the inside to the outside of the housing 1. In the hermetic terminal 110 according to the present embodiment, the insulator 14 is disposed towards the inside of the housing 11 from the insulator 13. Therefore, assuming that the pressure in the direction from the inside to the outside of the housing is equivalent, the pressure from the pressure vessel chamber side produces a pressure σ1 on the insulator 14 in the direction from the inside to the outside of the housing 11 in the hermetic terminal 110 as well. However, pressure is also applied on the surface 31 in the hermetic terminal 110, as illustrated in FIG. 8. Due to this pressure, a compressive stress σc1 is also applied to the insulator 14 of the hermetic terminal 110 from the space 28 towards the center of the hermetic terminal 110. Defining the stress on the insulator 14 as σ2 in a state in which the compressive stress σc1 is applied in addition to the pressure σ1, the relationship σ1>σ2 holds due to the effect of the compressive stress σc1. In other words, the stress applied to the insulator 14 of the hermetic terminal 110 according to the present embodiment is weaker than the pressure applied to the insulator 7 of the hermetic terminal 100 of the comparative example. The hermetic terminal 110 according to the present embodiment can therefore improve the fracture endurance of the insulator 14. The resistance to high pressure improves as a result.

In this way, the hermetic terminal 110 according to the present embodiment has better resistance to noise, is usable in an explosive atmosphere, and has improved resistance to high pressure.

Second Embodiment

Figure 9:
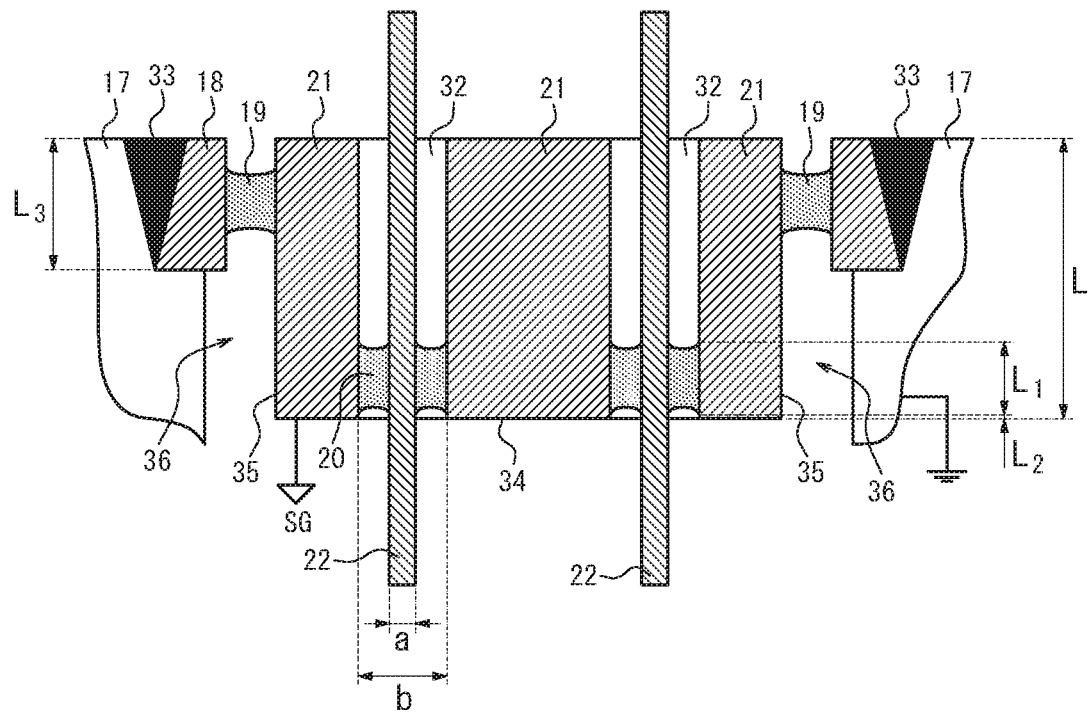
FIG. 9 is a cross-section of a hermetic terminal according to a second embodiment of the present disclosure.

FIG. 9 is a cross-section of a hermetic terminal 120 according to a second embodiment of the present disclosure. The hermetic terminal 120 of the second embodiment in FIG. 9 is attached to a housing 17 of a sensor unit. The housing 17 is grounded. Holes are provided in the housing 17. The hermetic terminal 120 is attached to the housing 17 so as to block the holes of the housing 17. In FIG. 9, the area above the hermetic terminal 120 is the outer portion of the housing 17, and the area below the hermetic terminal 120 is the inner portion of the housing 17. The space below the hermetic terminal 120 may, for example, be a pressure vessel chamber. For example, the pressure vessel chamber is filled with an intermediate medium, such as silicone oil, that transmits the pressure of a process.

The hermetic terminal 120 includes a barrier wall 18. For example, the barrier wall 18 has an annular shape with a circular opening in the center. A body 21 is fixed to the barrier wall 18 via an insulator 19 so as to block the opening at the center of the annular barrier wall 18. The body 21 has a cylindrical shape with a diameter smaller than the diameter of the opening at the center of the barrier wall 18. The opening of the barrier wall 18 need not be circular and may have a different shape instead. The body 21 is connected to a signal ground. Holes 32 that pass through the body 21 are provided in the body 21. The body 21 includes two holes 32 in the example in FIG. 9. One signal line 22 passes through each hole 32 of the body 21. The signal line 22 is both fixed to the body 21 and electrically insulated from the body 21 by an insulator 20. For example, the signal lines 22 may be conductors that transmit a signal corresponding to pressure.

The hermetic terminal 120 is joined to the housing 17 by, for example, being welded to the housing 17 via a weld metal 33. In the hermetic terminal 120, the barrier wall 18 is joined to the housing 17 via the weld metal 33. The body 21 of the hermetic terminal 120 is not joined to the housing 17. In the present embodiment, the height of the body 21 is greater than the height of the barrier wall 18. The height refers to the length from the outer end face to the inner end face. Accordingly, the height of the body 21 is L in FIG. 9, and the height of the barrier wall 18 is $L_3$ in FIG. 9. The body 21 is fixed to the barrier wall 18 so that the inner end face 34 of the body 21 is positioned towards the inside of the housing 17 from the inner end face of the barrier wall 18. In the example in FIG. 9, the body 21 is fixed to the barrier wall 18 so that the outer end face of the barrier wall 18 and the outer end face of the body 21 are coplanar. Accordingly, a space 36 exists between the inner wall of the housing 17 and a surface 35 that intersects the inner end face 34 of the body 21.

In the hermetic terminal 120, the insulator 20 is disposed towards the inside of the housing 17 from the insulator 19. In other words, the insulator 20 is provided in the hermetic terminal 120 in the height direction within a range included in the height of the space 36. For example, the insulator 20 is provided near the end face 34 in the hermetic terminal 120, as illustrated in FIG. 9.

Figure 10:
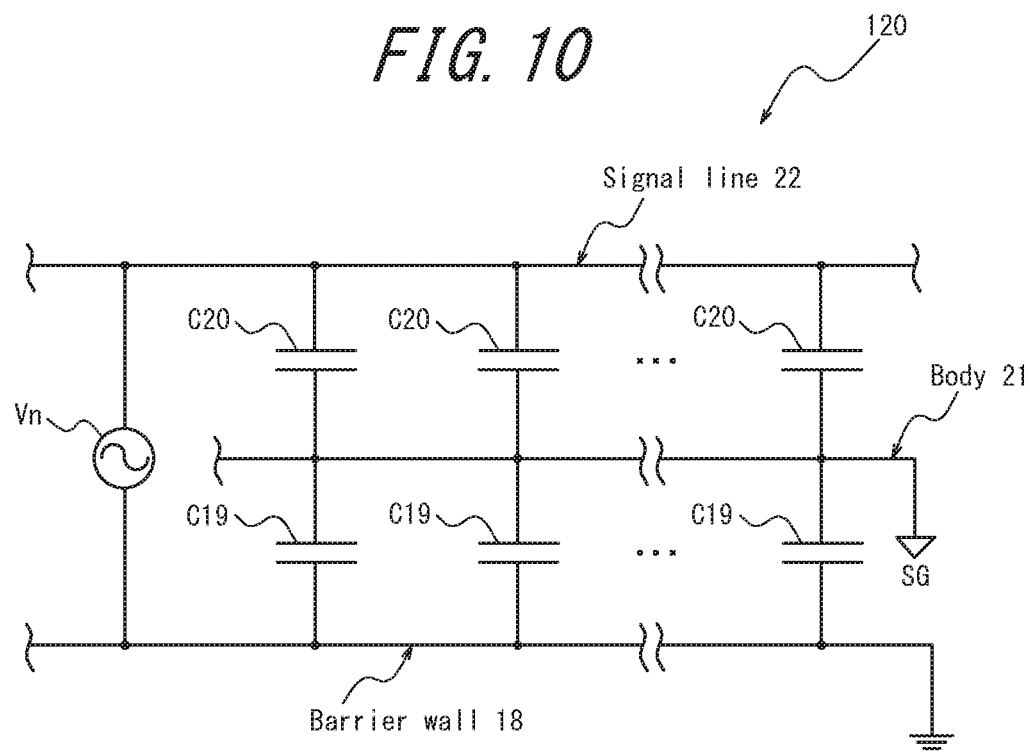
FIG. 10 illustrates an equivalent circuit of the hermetic terminal in FIG. 9.

FIG. 10 illustrates an equivalent circuit of the hermetic terminal 120 in FIG. 9. As illustrated in FIG. 10, the capacitance between the barrier wall 18 and the body 21 with the insulator 19 therebetween is designated as C19, and the capacitance between the body 21 and the signal line 22 with the insulator 20 therebetween is designated as C20. In FIG. 10, Vn represents noise voltage.

Since the body 21 in the hermetic terminal 120 is connected to the signal ground, the body 21 functions as a shield against noise that mixes in from the grounded portion of the housing 17 and the signal line 22. The parasitic capacitance between the housing 17 and the signal line 22 is thereby reduced.

The thickness of the hermetic terminal 120 is designated as L. In other words, the length from the outer surface of the barrier wall 18 and the body 21 to the inner surface of the body 21, i.e. to the end face 34, is the thickness L of the hermetic terminal 120, as illustrated in FIG. 9. The length of the insulator 20 that fixes the signal line 22 is designated as $L_1$. The length of the insulator 20 is the length from the inner end to the outer end, as illustrated in FIG. 9. The length (distance) from the inner end face of the insulator 20 to the inner end face of the body 21, i.e. to the end face 34, is designated as $L_2$. The diameter of the signal line 22 is designated as a, and the diameter of the hole 32 is designated as b.

Since the body 21 is connected to the signal ground, the parasitic capacitance C20 between the body 21 and the signal line 22 becomes substantially zero and may be ignored. Therefore, defining the separation distance between the barrier wall 18 and the signal line 22 as r, the parasitic capacitance C3 between the housing 17 and the signal line 22 of the hermetic terminal 120 according to the present embodiment illustrated in FIG. 9 is expressed in Equation (3) below, using a coefficient k.

$$C3 = k \frac{L}{\oint \frac{1}{r} dr} \quad (3)$$

Since the body 21 in the hermetic terminal 120 is connected to the signal ground, parasitic capacitance does not occur between the body 21 and the signal line 22, regardless of the length $L_1$ of the insulator 20 or the length $L_2$ from the inner end of the insulator 20 to the inner end (i.e. the end face 34) of the body 21. Accordingly, the parasitic capacitance C3 is determined only by the length L and the separation distance r between the barrier wall 18 and the signal line 22 and is a constant value regardless of the lengths $L_1$ and $L_2$.

Figure 11:
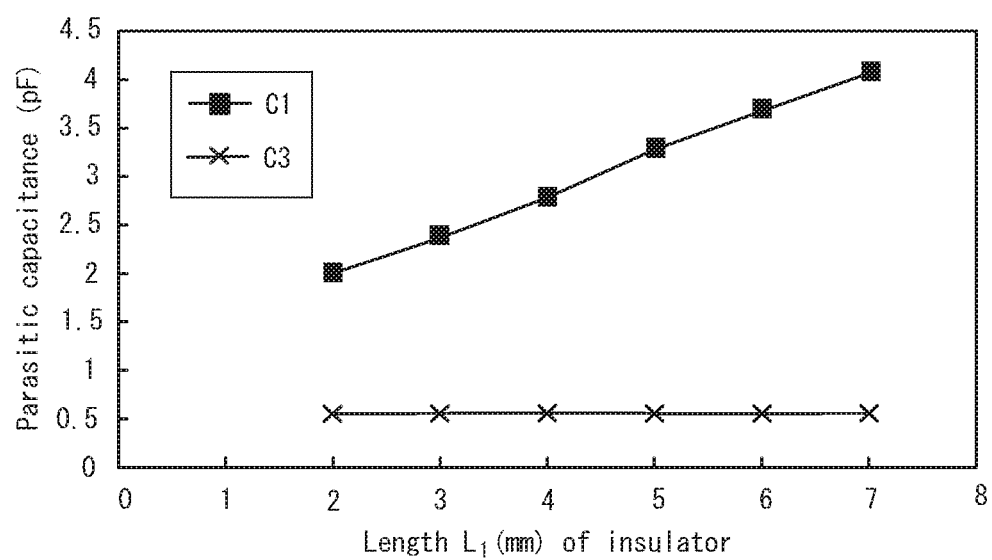
FIG. 11 illustrates the parasitic capacitance of the hermetic terminal of the comparative example and the hermetic terminal according to the second embodiment.

FIG. 11 illustrates the parasitic capacitance C1 of the hermetic terminal 100 of the comparative example and the parasitic capacitance C3 of the hermetic terminal 120 according to the second embodiment. FIG. 11 illustrates the relationship between the length $L_1$ of the insulator, the parasitic capacitance C1, and the parasitic capacitance C3 for the case of the length L of the hermetic terminal being 10 mm, the length $L_2$ from the inner end of the insulator to the inner end of the body being 0 mm, the ratio of the diameter b to the diameter a, i.e. b/a, being 3, the relative permittivity $\varepsilon_{r1}$ of the insulator being 4.6, and $$\oint \frac{1}{r} dr$$

in Equation (3) being 1.

As illustrated in FIG. 11, the parasitic capacitance C of the hermetic terminal 100 of the comparative example is greater than the parasitic capacitance C3 of the hermetic terminal 120 according to the present embodiment. Furthermore, as the length $L_1$ of the insulator is greater, the parasitic capacitance C1 of the hermetic terminal 100 of the comparative example increases, whereas the parasitic capacitance C3 of the hermetic terminal 130 according to the present embodiment remains constant, regardless of the length $L_1$ of the insulator. Therefore, the difference between the parasitic capacitance C1 and the parasitic capacitance C3 increases as the length $L_1$ of the insulator is greater. The length $L_1$ sometimes varies when the insulator 20 is enclosed in the hole 32 during manufacturing of the hermetic terminal 120 and therefore is placed on the horizontal axis in FIG. 11.

In this way, the hermetic terminal 120 according to the present embodiment can keep the parasitic capacitance C3 constant. The hermetic terminal 120 can thus improve noise resistance.

In the hermetic terminal 120 according to the present embodiment, the barrier wall 18 is disposed between the grounded housing 17 and the signal line 22. Some explosion-proof standards include prescriptions relating to the interval between the grounded housing 17 and the signal line 22. By including the barrier wall 18, the hermetic terminal 120 provides a constant distance between the grounded housing 17 and the signal line 22. The hermetic terminal 120 can thus more easily satisfy the requirement of the explosion-proof standards to the interval between the housing 17 and the signal line 22. Therefore, the hermetic terminal 120 can be used in an explosive atmosphere.

Furthermore, the body 21 is fixed to the barrier wall 18 via the insulator 19 in the hermetic terminal 120 according to the present embodiment, so that the inner end face 34 of the body 21 is positioned towards the inside of the housing 17 from the inner end face of the barrier wall 18, and the outer end face of the barrier wall 18 and the outer end face of the body 21 are coplanar. Accordingly, designating the length of the weld metal 33 as $L_3$, the relationship $L > L_3$ is satisfied, as illustrated in FIG. 9. The length $L_3$ of the weld metal 33 is the length from the inner end to the outer end. The length $L_1$ of the insulator 20 may, for example, satisfy the relationship $L_1 < L - L_3$.

Figure 12:
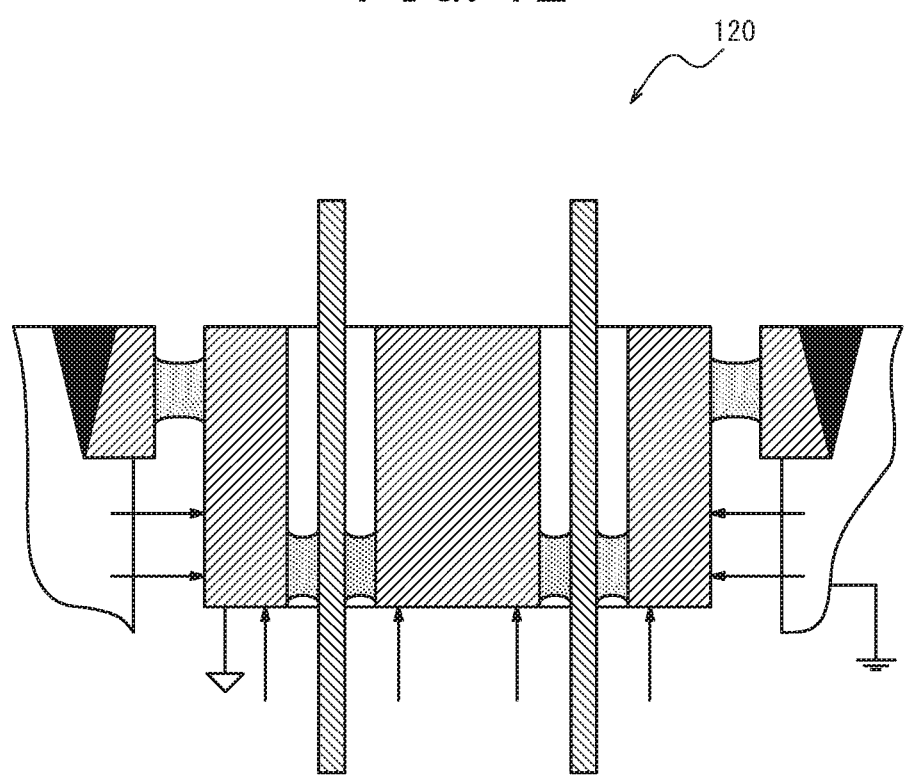
FIG. 12 illustrates pressure acting on the hermetic terminal of FIG. 9.

Here, as illustrated in FIG. 9, the space 36 having a length of at least $L - L_3$ is formed between the hermetic terminal 120 and the housing 17. FIG. 12 illustrates pressure acting on the hermetic terminal 120 of FIG. 9. The insulator 20 in the hermetic terminal 120 is provided towards the inside of the housing 17 from the insulator 19. Therefore, as indicated by the arrows in FIG. 12, the hermetic terminal 120 receives pressure from the pressure vessel chamber side at the end face 34 and the surface 35. In other words, the hermetic terminal 100 of the comparative example receives pressure from the pressure vessel chamber side only at the inner end face of the body, for example. In the hermetic terminal 120 according to the present embodiment, however, pressure is applied not only to the end face 34 but also to the surface 35 intersecting the end face 34. When, for example, the relationship $L - L_2 > L$, is satisfied, the pressure applied to the surface 35 is more easily transmitted to the insulator 20. Accordingly, by the same principle as was described in the first embodiment, the stress applied to the insulator 20 of the hermetic terminal 120 according to the present embodiment is weaker than the stress applied to the insulator 7 of the hermetic terminal 100 of the comparative example. The hermetic terminal 120 according to the present embodiment can therefore improve the fracture endurance of the insulator 20. The resistance to high pressure improves as a result.

In this way, the hermetic terminal 120 according to the present embodiment has better resistance to noise, is usable in an explosive atmosphere, and has improved resistance to high pressure.

Figure 13:
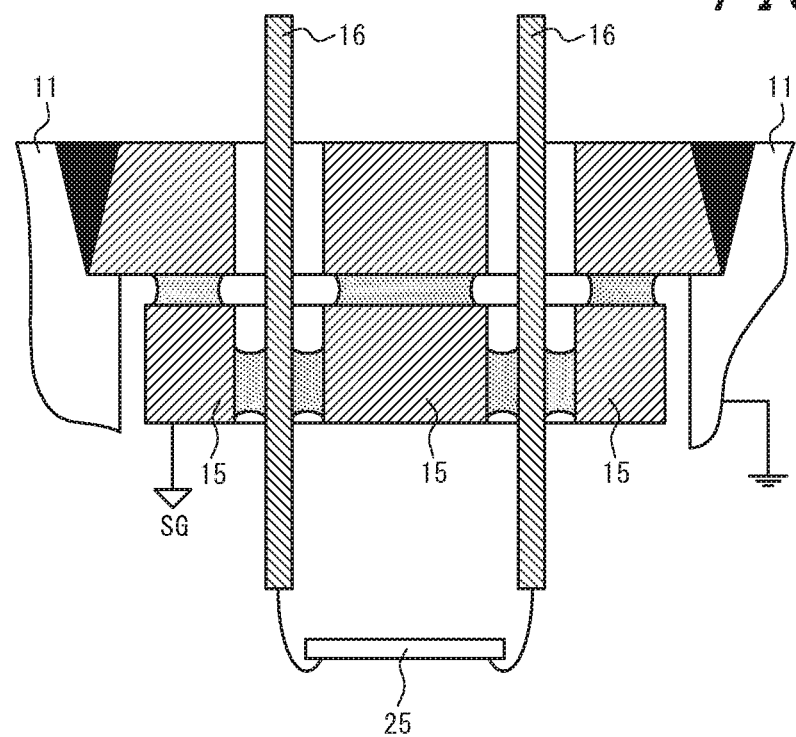
FIG. 13 illustrates a modification to the hermetic terminal according to the first embodiment.
Figure 14:
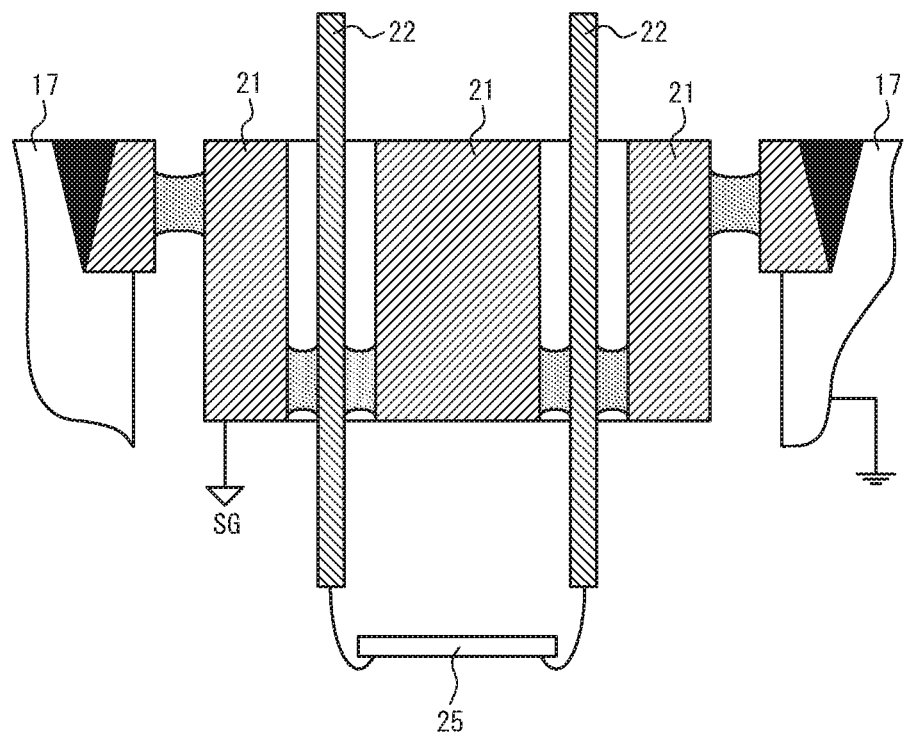
FIG. 14 illustrates a modification to the hermetic terminal according to the second embodiment.

FIG. 13 and FIG. 14 illustrate modifications to the hermetic terminal according to the first embodiment and the second embodiment. The two signal lines 16 in the modification in FIG. 13, and the two signal lines 22 in the modification in FIG. 14, are connected electrically by an impedance element 25, such as a resistor, in the pressure vessel chamber. The impedance element 25 may be an element that has impedance allowing a reduction in the parasitic capacitance between the housing and the signal lines. In the modifications in FIG. 13 and FIG. 14, the parasitic capacitance between the housing of the hermetic terminal and the signal lines is reduced by the impedance element 25, thereby further improving the resistance to noise.

Figure 15:
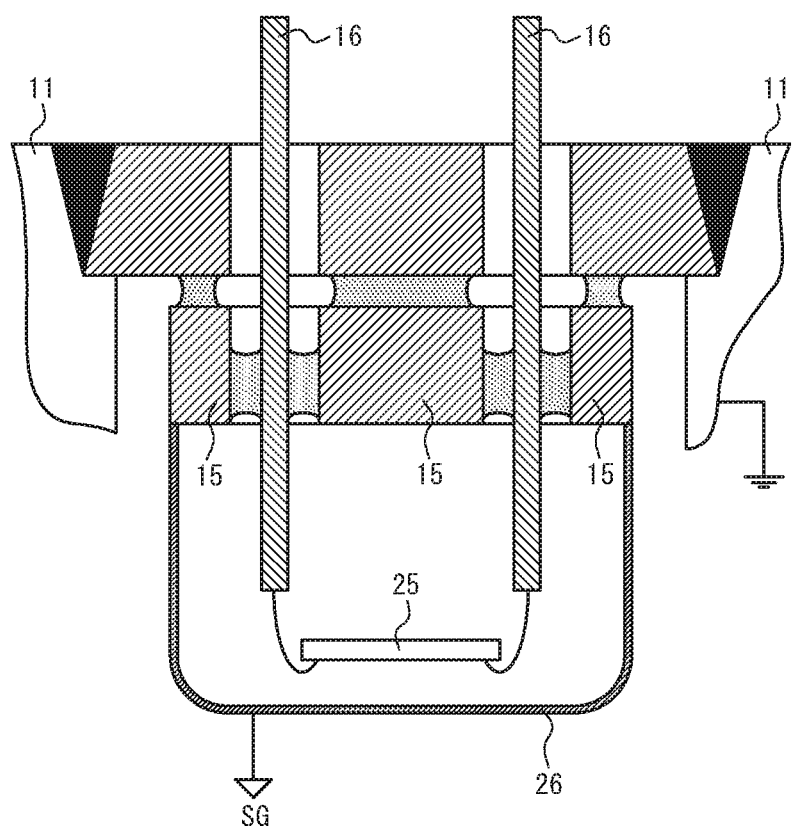
FIG. 15 illustrates another modification to the hermetic terminal according to the first embodiment.
Figure 16:
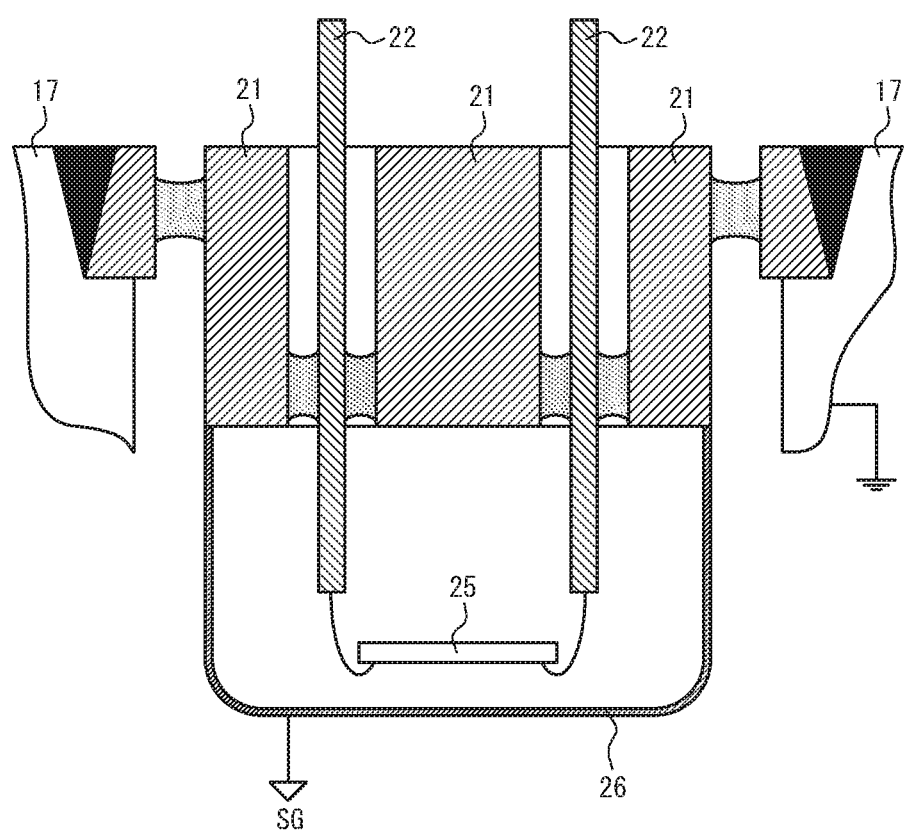
FIG. 16 illustrates another modification to the hermetic terminal according to the second embodiment.

FIG. 15 and FIG. 16 illustrate other modifications to the hermetic terminal according to the first embodiment and the second embodiment. In addition to the configuration illustrated in FIG. 13 and FIG. 14, the hermetic terminals in the modifications illustrated in FIG. 15 and FIG. 16 include a conductive material 26 attached to the bodies 15 and 21 so as to cover the impedance element 25. In these modifications, the conductive material 26 is connected to the signal ground. When the hermetic terminal thus includes the conductive material 26 that covers the impedance element 25, noise that mixes in from the housing 11 or 17 also flows to the signal ground, in addition to the noise that mixes in from the signal lines 16 or 22. The body 15 or 21 and the conductive material 26 thus function as a shield against noise, further improving the resistance to noise.

Figure 17:
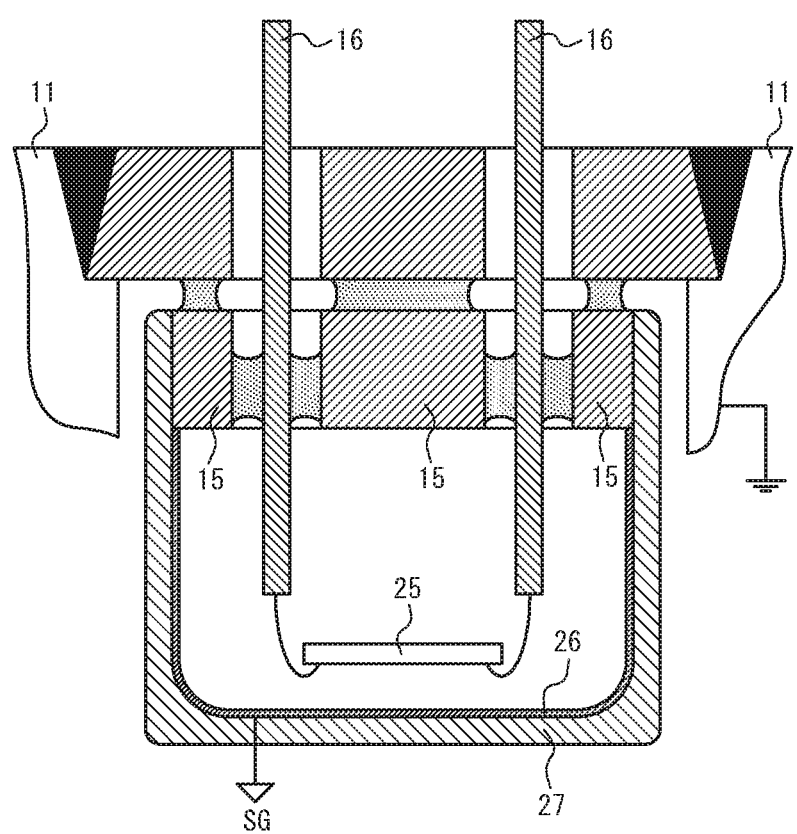
FIG. 17 illustrates yet another modification to the hermetic terminal according to the first embodiment.
Figure 18:
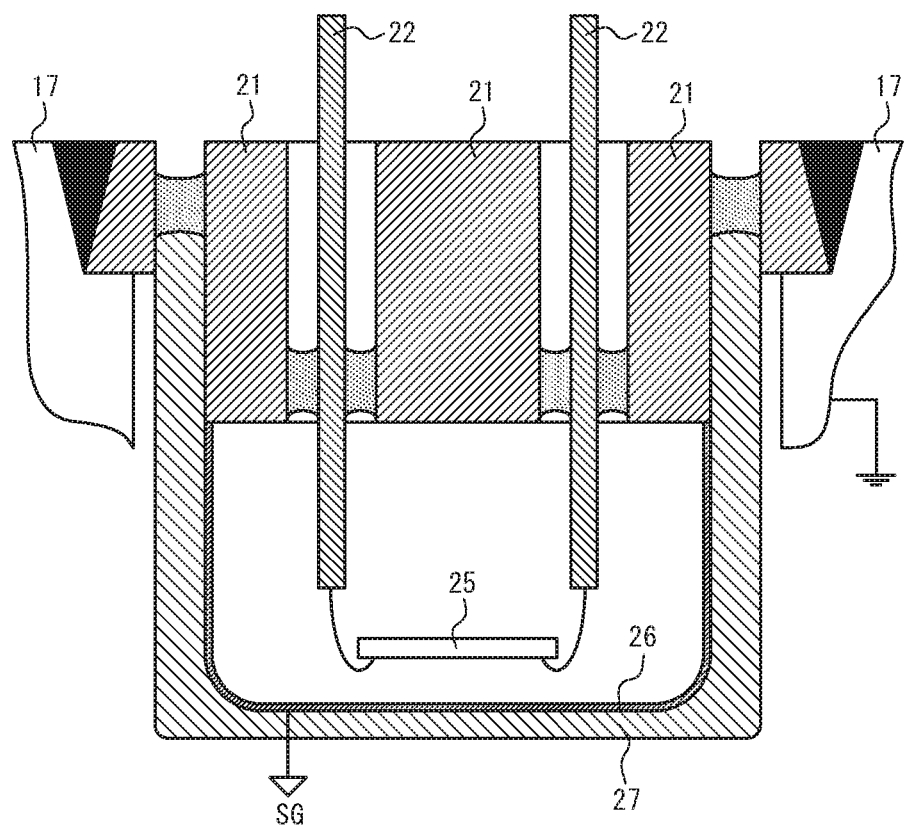
FIG. 18 illustrates yet another modification to the hermetic terminal according to the second embodiment.

FIG. 17 and FIG. 18 illustrate further modifications to the hermetic terminal according to the first embodiment and the second embodiment. In addition to the configuration illustrated in FIG. 15 and FIG. 16, the hermetic terminals in the modifications illustrated in FIG. 17 and FIG. 18 include an insulator 27 surrounding the conductive material 26. When the body 15 or 21 is thus covered by the insulator 27, the housing 11 or 17 is electrically insulated from the body 15 or 21, which is connected to the signal ground via the conductive material 26. The separation distance between the housing 11 or 17 and the body 15 or 21, which is connected to the signal ground via the conductive material 26, may be prescribed in predetermined standards, for example. Even in this case, the separation distance in the predetermined standards can be shortened by the insulator 27, thereby allowing the distance between the housing 11 or 17 and the body 15 or 21, which is connected to the signal ground via the conductive material 26, to be shortened. The hermetic terminal can thus be reduced in size.

Embodiments of the present disclosure have been described with reference to the drawings, but the present disclosure is not limited to these embodiments, and a variety of modifications may be made without departing from the spirit and scope thereof.

The invention claimed is:

1. A hermetic terminal comprising:
a barrier wall to be joined to a housing;
a body to be connected to a signal ground, the body being fixed to the barrier wall via a first insulator; and
a signal line provided in a hole passing through the body and fixed to the body via a second insulator provided in the hole; wherein
the body is not directly connected to the housing via an insulator,
when the barrier wall is joined to the housing, a space is formed between an inner wall of the housing and a surface of the body intersecting an end face of the body positioned towards an inside of the housing,
a hole passing through the barrier wall is provided in the barrier wall,
the signal line is provided in the hole passing through the barrier wall, and
the first insulator is provided so as to surround the hole passing through the barrier wall.

2. The hermetic terminal of claim 1, wherein the body is fixed to the barrier wall at a position towards the inside of the housing from the barrier wall when the barrier wall is joined to the housing.

3. The hermetic terminal of claim 1,
wherein the barrier wall comprises an opening; and
wherein the body is fixed to the barrier wall via the first insulator so as to cover the opening.

4. The hermetic terminal of claim 1, wherein the second insulator is disposed towards the inside of the housing from the first insulator.

5. The hermetic terminal of claim 1, wherein a length from an inner end to an outer end of the second insulator is less than a difference between a length from an inner end to an outer end of the hermetic terminal and a length from an inner end to an outer end of a joining metal for joining the barrier wall to the housing.

6. The hermetic terminal of claim 1, wherein a difference between a length from an inner end to an outer end of the hermetic terminal and a length from an inner end of the second insulator to an inner end of the body is greater than a length from an inner end to an outer end of a joining metal for joining the barrier wall to the housing.

7. The hermetic terminal of claim 1, further comprising a plurality of the signal lines and an impedance element electrically connecting the plurality of the signal lines.

8. The hermetic terminal of claim 7, further comprising a conductive material attached to the body and covering the impedance element.

9. The hermetic terminal of claim 8, further comprising an insulator surrounding the conductive material.

10. A sensor unit comprising the hermetic terminal of claim 1.

* * * * *